United States Patent [19]

Glöggler

[11] 4,347,809
[45] Sep. 7, 1982

[54] DRINKING BOWL SYSTEM FOR FARM AND OTHER ANIMALS

[76] Inventor: Martin Glöggler, Memelstrasse 34, D-7910 Neu-Ulm, Fed. Rep. of Germany

[21] Appl. No.: 239,620

[22] Filed: Mar. 2, 1981

[51] Int. Cl.³ .................................................. A01K 7/02
[52] U.S. Cl. .......................................................... 119/81
[58] Field of Search ............................... 119/72, 75, 81

[56] References Cited

U.S. PATENT DOCUMENTS

| | | | |
|---|---|---|---|
| 2,762,333 | 9/1956 | Smith | 119/81 |
| 2,810,367 | 10/1957 | Edmonston | 119/81 |
| 3,093,111 | 6/1963 | Garrison | 119/72 |
| 3,797,513 | 3/1974 | Hazen | 119/72 X |
| 3,802,395 | 4/1974 | Taschitzki | 119/75 |

FOREIGN PATENT DOCUMENTS

| | | | |
|---|---|---|---|
| 652248 | 3/1929 | France | |
| 1102117 | 10/1955 | France | 119/81 |
| 577500 | 5/1946 | United Kingdom | |

Primary Examiner—Gene Mancene
Assistant Examiner—Robert P. Swiatek
Attorney, Agent, or Firm—Fleit & Jacobson

[57] ABSTRACT

For watering cattle with a high efficiency, an automatic drinking bowl is designed to give a high or low water inlet rate, which is automatically matched to the drinking rate of the cow or other animal so that drinking may take place as from a natural watering place. When not in use, the spring-supported bowl is pushed downwards by the water in it shutting off an inlet valve. On a cow's drinking from the bowl, and so decreasing the weight of the water therein, the bowl is pushed upwards by the spring so that the water inlet valve is opened to an amount fully in step with the distance the bowl is moved upwards by the spring and so that the water inlet rate is very much in line with the animal's drinking rate. The bowl is hinged to a support and joined with the inlet valve by a flexible hose. The water inlet opening is at the lowest point in the bowl and next to the water inlet opening, and there is a cleaning opening for clearing waste from the bowl.

10 Claims, 4 Drawing Figures

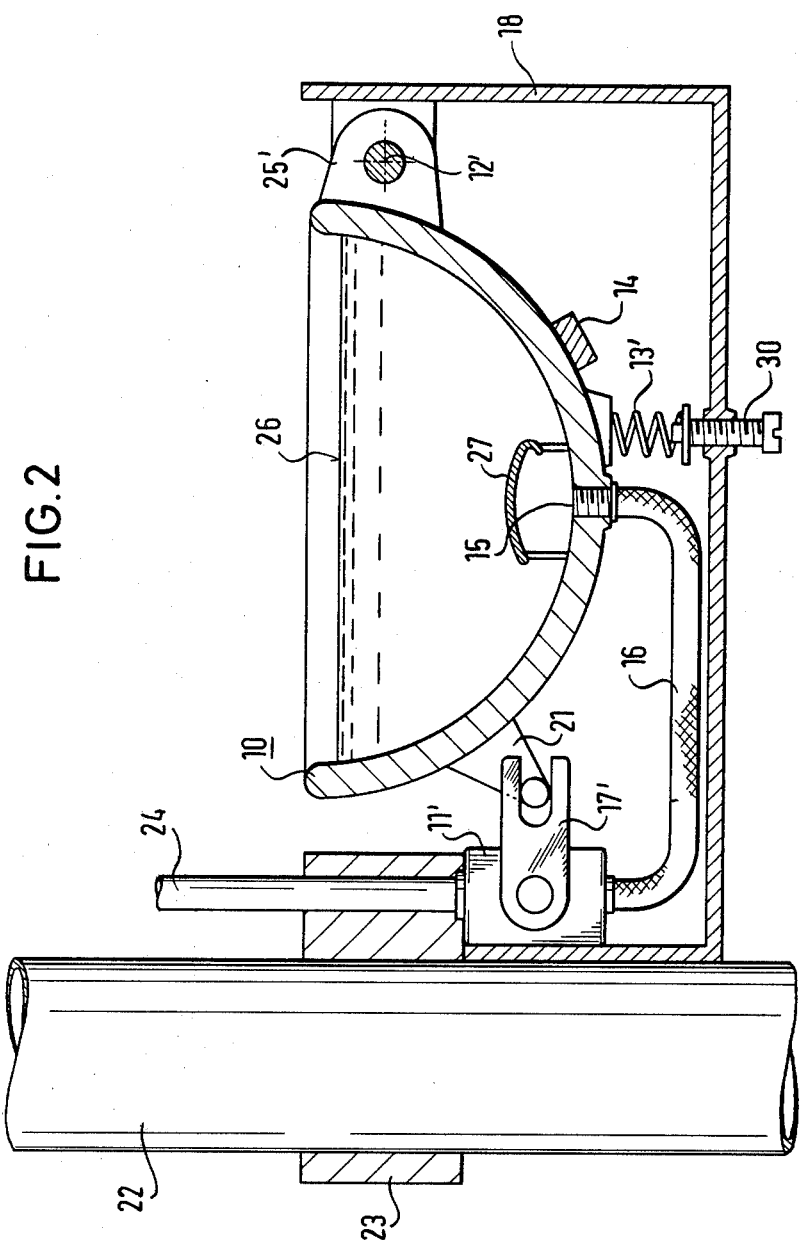

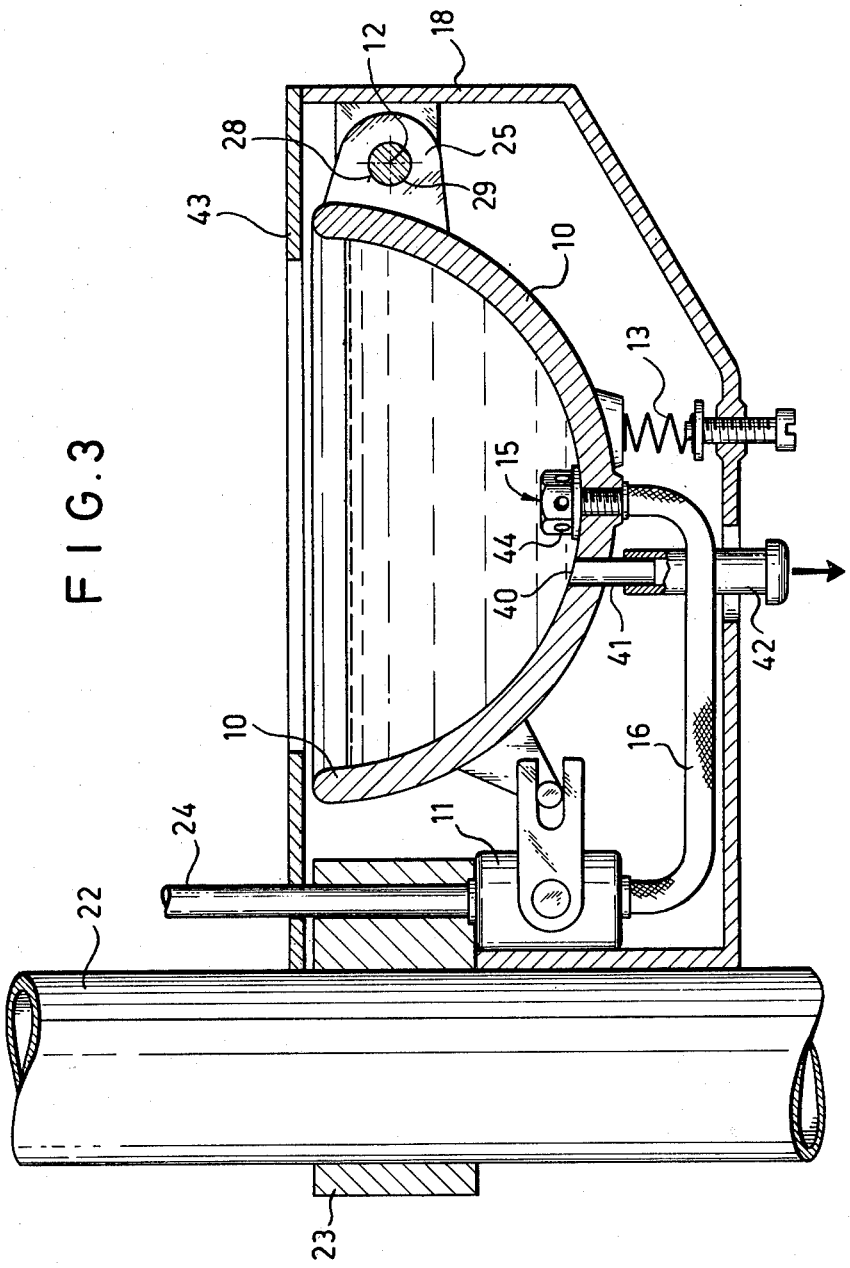

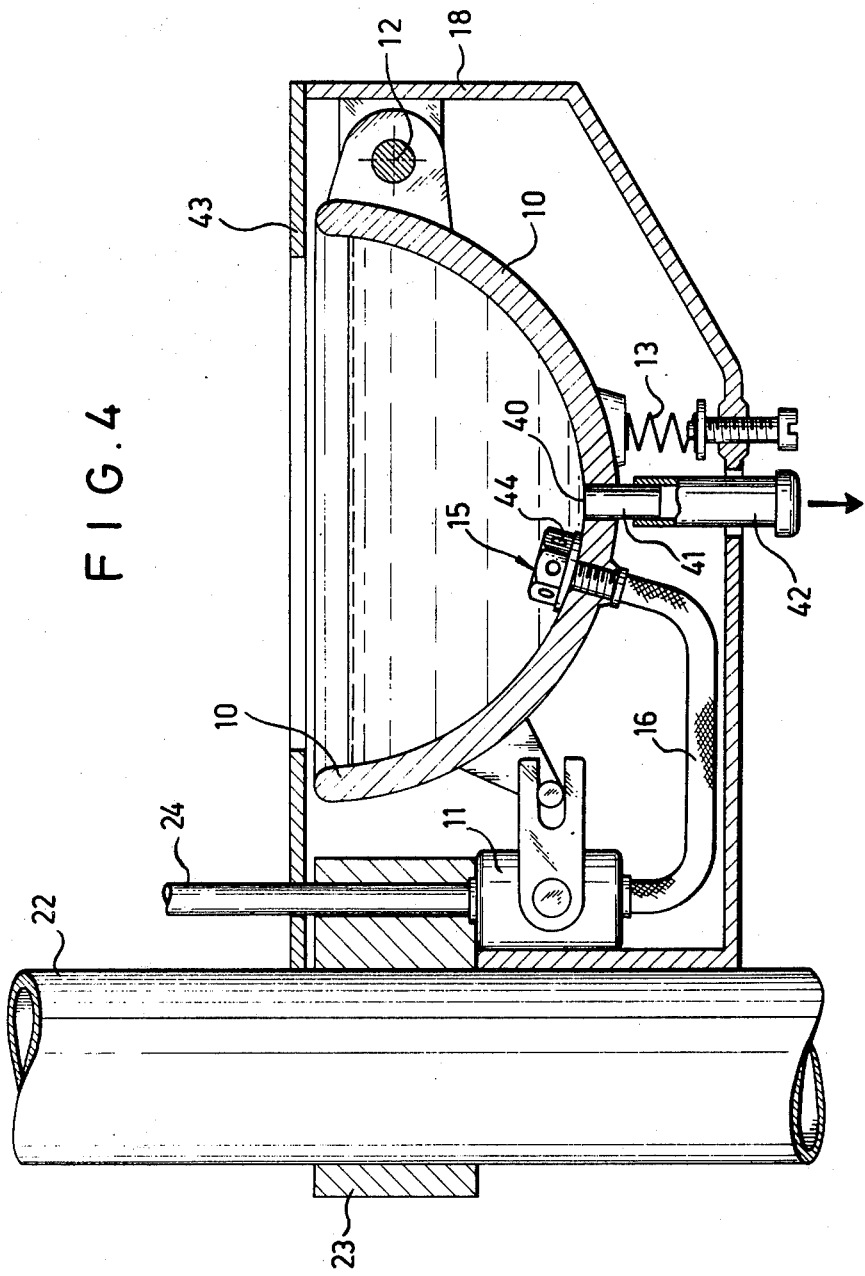

DRINKING BOWL SYSTEM FOR FARM AND OTHER ANIMALS

BACKGROUND OF THE INVENTION

The present invention is with respect to an automatic drinking bowl system for animals, more especially cattle, in the case of which a drinking bowl is designed to be moved against a restoring force, with an upright component of motion, through a desired distance under the weight of water let into the bowl by way of a water inlet valve and, on water being taken from said bowl, is moved upwards by said restoring force into an upper position in which a water inlet valve is open, the valve being shut in said lower bowl position.

Such a drinking bowl system is to be seen in U.S. Pat. No. 3,802,395 while a further system on much the same lines for watering cattle is to be seen in British Pat. No. 577,500.

Such known systems have the same design shortcoming that, on drinking water being run into the bowl, the moving bowl is acted upon by disturbing forces having an undesired effect on exact control of the motion of the bowl and, for this reason, on the measuring out of the desired amount of water or on the control of the water rate. The water moving downwards on to the moving bowl is responsible, because of its speed of flow and reaction forces, for a disturbing effect stopping exact control of the water amount or water rate so as to be dependent on the angle of the drinking bowl, such a disturbing effect increasing with the rate of water inlet.

If, in the case of known systems, the flow rate is greatly increased, a force is produced about, and at some distance from the turnpin supporting the bowl so that it may well be that the drinking bowl is moved into a position such that the valve will be kept open even when the bowl is in fact full of water to the desired level, the water then running over the top edge of the drinking bowl.

Furthermore, in the case of such known systems, there is the shortcoming that the bowl of the automatic drinking system has to be taken off its support for cleaning, for example for clearing pieces of animal feed or other substances not desired in the drinking water.

In a further known automatic drinking bowl (see French patent No. 652,248) the bowl part is turningly supporting and supplied with water by way of a flexible hose joined with a water inlet opening, such turning of the bowl not, however, being used for operation of the valve, but only for clearing water from it and cleaning purposes.

SHORT OVERVIEW OF THE INVENTION

One purpose of the present invention is that of designing an automatic drinking bowl system from which animals may take up water by a natural sucking effect, such water taken up by the animal having its place taken in the bowl at a rate, which is automatically geared to the rate as needed by animals.

Any pieces of feedstuff which are not caused to come to the surface of the water by the washing effect of the inlet water so that they may be taken up by the animal and, in fact, go down to the bottom of the water in the bowl, are able to be very simply cleaned from the drinking bowl with a high efficiency.

For effecting this purpose, the automatic drinking bowl system of the invention has a bowl with a water inlet opening which is joined by a flexible hose with the water inlet valve, the water inlet opening being deeper down in the bowl than other parts of such bowl, that is to say at the deepest point therein.

The invention makes use of the discovery that drinking in a way which is natural for the animals in question is only made certain of if drinking is able to take place at the animal's natural drinking rate or uptake rate and in one gulp or draft a certain natural amount of water may be taken up.

The important useful effect produced by the invention is that, even high performance milch cows may take up water in such a way as is fully in line with their normal drinking habits, more specially with respect to the speed or rate of drinking as desired by such an animal. Furthermore, with the placing of the water inlet as part of the invention together with the flexible hose, there is not only a step forward in the art insofar as specially high rates of drinking are made possible, but furthermore a self-cleaning effect of the bowl is produced.

Because, in fact, any pieces of feedstuff still in the drinking bowl, or other undesired substances, are kept on the move by the water run in to the bowl in an upward direction at a high speed, there is, in addition to exact control of high rates of flow, furthermore an automatic cleaning effect.

More especially, in the case of a form of the invention designed for a single animal, the water inlet rate may undergo adjustment, using the water inlet valve, to be geared to the speed of drinking of the animal using the bowl on normal suction drinking. For example, in the case of an automatic drinking system for cattle, the water inlet valve may undergo adjustment to a water rate of about 25 liters each minute.

Using such a form of the invention, it is possible to make certain that even high performance milch cows may take up their desired amount of drinking water in one draft, this only being possible when drinking is able to take place at the wonted rate.

The apparatus of the invention is furthermore more especially geared to the normal drinking behavior of the animals inasmuch as the water inlet valve is so designed that, on upward motion of the drinking bowl, it is opened steplessly to a greater and greater degree and, for this reason, may undergo adjustment to a smoothly increasing rate. An animal drinking from the drinking bowl of the invention may generally be said to have the water inlet rate under its own control, that is to say matching its own drinking speed, because, on the drinking speed increasing, the overall weight of the drinking bowl will be decreased more quickly than at a lower drinking rate, so that the water inlet valve will be opened more quickly. For this reason, as part of the invention, a balanced condition between, on the one hand, the taking of water from the drinking bowl on drinking and the input of water thereto may take place for more or less any drinking rate needed.

In most cases, a mechanical connection will be used so that the moving valve part of the inlet valve is moved on motion of the drinking bowl, this making for a rugged design, although, however, as part of the invention, air-power, hydraulic or other systems for joining the bowl and the valve would be possible.

As part of a further development of the invention of value, at the deepest point in the drinking bowl, next to the water inlet opening, there is a cleaning opening which has a stopper for stoppering it and which may be taken therefrom.

In this respect, it is more especially possible for the water inlet opening to be placed at the lowest point in the drinking bowl, whose wall is designed sloping uwpards steeply on all sides from the edge of the water inlet opening, the cleaning opening being placed right next to the water inlet opening.

In a second possible preferred form, the cleaning opening is placed at the lowest point in the drinking bowl, whose wall is designed sloping uwpards steeply on all sides from the edge of the cleaning opening, the water inlet opening being placed right next to the cleaning opening.

For making use of the stopper simpler, the cleaning opening may be joined up with a downwardly running tailpipe.

In the invention any pieces of feedstuff or other undesired substances will be moved downwards on the steep wall of the drinking bowl into the deepest part from where, in the event of their not being moved up to the top face of the water let into the bowl so that they are taken up by the animal being watered, they may simply be cleared from the drinking bowl by hand, that is to say by pulling out the stopper and letting them out.

One important useful effect produced by the invention is that, even under poor working conditions, for example when only a low head of water is on hand, cleaning of the drinking bowl may be readily undertaken with good effect. Using the system of the invention, the drinking bowl may be readily cleaned even if the drinking water has become dirty because of the presence for example of dung, maize silage or other pieces of animal feed in the bowl. After pulling out the stopper from the cleaning opening, the dirty water may be let off by way of a gutter or any other system of the right design.

As part of a further development of the invention of good effect, the cleaning effect may be made even stronger and more powerful if the water inlet opening has at least one water outlet nozzle or opening for jetting water on to the cleaning opening so that the desired cleaning effects may even be produced in conditions in which the cleaning opening is stopped up by pieces of feedstuff or the like completely.

As part of a further preferred form of the invention, it is possible for the cleaning opening to be stopped from being blocked by waste if the stopper, in the shut condition of the cleaning opening, is such as to be sticking upwards past the edge of the cleaning opening into the drinking bowl.

As part of the invention, for this reason, by using together the properties of a given form of a drinking bowl and a special design of the cleaning opening together with a water inlet opening placed at a special position, it is possible to make certain that, even under very poor working conditions, simple and readily undertaken cleaning of the drinking bowl may take place.

An account will now be given of working examples of the invention using the figures.

FIG. 2 is a vertical section through a further possible working example.

FIG. 3 is an upright section through a preferred working example of a system of the invention.

FIG. 4 is a further upright system, generally on the same lines of a further form of the invention.

DETAILED ACCOUNT OF WORKING EXAMPLES OF THE INVENTION

Figure 1:
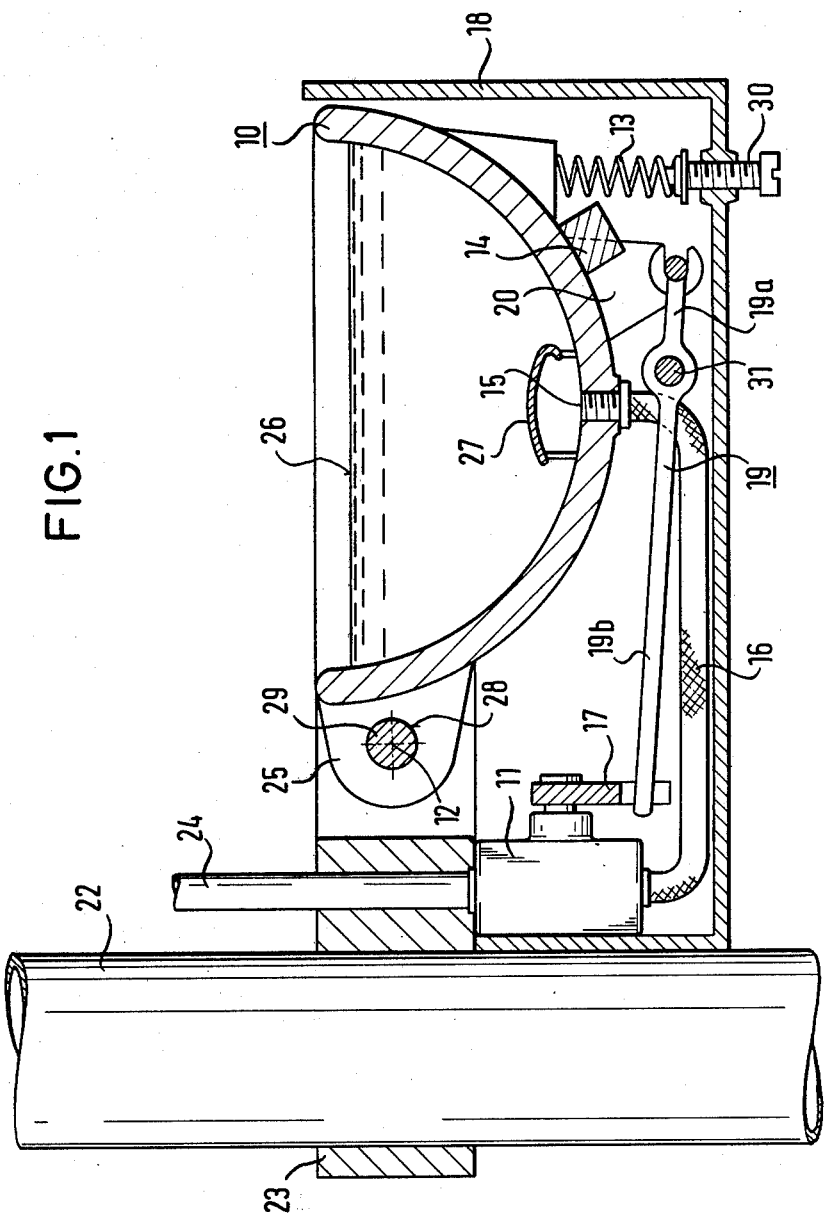
FIG. 1 is a vertical section through a preferred working example of a system of the invention.

On turning now to the view of FIG. 1, it will be seen that a drinking bowl 10 has an ear 25 with an opening 28 taking up a turnpin 29. Turnpin 29 is fixed to housing 18 of the drinking bowl. Drinking bowl 10 may, for this reason, be turned about turnpin 12 the opposite edge of the bowl moving in an arc, the turnpin being, generally speaking, horizontal.

The drinking bowl 10 with all the parts to be detailed in the present specification, is fixed by a gripping collar 23 to a fixed stanchion 22.

The drinking bowl 10, best has a rounded cup-like form and at its lowest point drinking bowl 10 has a water inlet opening 15 joined by way of a flexible hose 16 with a water inlet valve 11, which valve 11 is joined up with a water supply pipe 24. Over water inlet opening 15, there is a cover 27 for causing water, which is being let into the drinking bowl 10, to be changed in direction in a radially outward direction along the floor of the drinking bowl. For this reason, there is, on the one hand, the effect that the water current or flow is forced along the floor of the drinking bowl so that any feedstuff waste or the like on the floor is taken along by the water, while, on the other hand, at the same time, distribution of the inlet water is made certain of so that, putting it somewhat differently, no strong jet is produced pointing in an upward direction.

Between the floor of housing 18 and the lower side of the drinking bowl 10, there is a compression spring 13 whose force has the tendency of lifting drinking bowl 10. With the help of an adjustment screw 30, the force of spring 12 may be changed as desired, the force on the adjustment of spring 13 being such that the weight of a drinking bowl full of water is great enough for forcing and turning the drinking bowl 10 about the horizontal turnpin 12 in a downward direction and forcing together spring 13 to such a degree that drinking bowl 10 comes to rest on a stop 14. If, using adjustment screw 30, the biasing effect of spring 13 is increased, a greater force will be necessary for moving drinking bowl 10 downwards against the stop. Because, however, water will keep flowing into the drinking bowl 10, as will be made clear later on, till the drinking bowl 10 gets to the stop 14, the water level in the drinking bowl will go up till the weight of the water is great enough for overcoming the greater biasing force of spring 13 and moving the drinking bowl against the stop 14. For this reaosn, using adjustment screw 30, the water level 26 may undergo adjustment as may be desired by the farmer.

On the lower side of drinking bowl 10, there is an ear 20 acting upon one arm 19a of a first class, that is to say two-armed, lever 19. First class lever 19 is supported at a turnpin 31 turningly on housing 18. The other arm 19b of first class lever 19 is joined up with a driving part 17 of water inlet valve 11.

In FIG. 1, the drinking bowl 10 is to be seen in its lower position, in which it is resting against stop 14, so as to be, in this position, offering an animal water in an amount which is generally equal to the full size of drinking bowl 10. For drinking it is only necessary for the animal to take up the water by a suction or draft effect as is its wont from level 26 of the water. As the level goes down, the weight acting on spring 13 will be decreased and, given the right spring force of spring 13, the drinking bowl 10 will be pushed upwards, that is to say with a turning motion counterclockwise about the horizontal turnpin 12. With such motion, the first class lever is, as well, turned on an anti-clockwise direction so that the water inlet valve 11 is opened and water will be run in through the water supply pipe 24, through the water inlet valve 11 and through the flexible hose 16 to the water inlet opening 15 in the drinking bowl 10. Because, as part of the invention, the water inlet valve 11 is so designed that, by smooth motion of the driving part 17, the water rate through the valve is smoothly increased, the amount of water, in each unit of time, let into the drinking bowl 10 will go up with upward motion of the drinking bowl caused by the spring 13 as more and more water is cleared from the bowl. In this way, an amount of water taken up at a high rate from the drinking bowl 10 will have its place taken by water coming into the bowl at the same rate by the water inlet valve 11 being opened more and more so that the animal will be offered a great enough amount of water, if its water up-take rate is not greater than the greatest possible rate of valve 11 or other parts of the system.

FIG. 2 is a view of a further possible form of the drinking bowl of the invention which, in its general design is the same as the system of FIG. 1 so that parts are marked by like part numbers. The working example of the invention of FIG. 2 is different to that of FIG. 1 more importantly in that a water inlet valve 11' is acted upon by way of a driving part 17' directly moved by a valve driving ear 21 fixed to the drinking bowl 10. Driving ear 21 moving the driving part 17' through contact with the driving ear slot cut into driving part 17'. The bowl moves about turnpin 12' in such a way that the edge of the bowl 10 opposite the turnpin moves in an arc. For this reason, unlike the working example of FIG. 1, in FIG. 2 there is an ear 25' on the drinking bowl 10 together with the horizontal turnpin 12' we have noted earlier, on the side of the drinking bowl 10 which is opposite to the side nearest the water inlet valve 11'. Moreover, the spring 13' as well as at a different point to that in the working example of FIG. 1 and furthermore this further form of the system of the invention of FIG. 2 is, in its general design and function, the same as the working example of FIG. 1.

Turning now to FIG. 3, a drinking bowl will be seen, which, in its key-parts is quite the same as the drinking bowl of FIG. 2. The housing 18 has a top cover 43 running out past the edge of the drinking bowl 10 in an inward direction.

Next to the water inlet opening 15, there is a cleaning opening 40 joined with a downwardly running tailpipe 41, whose lower end is stoppered by stopper 42. If waste feedstuff or other undesired material gets into the lower part of the drinking bowl 10, all that is necessary is to take off stopper 42 by pulling in the direction of the arrow for opening the cleaning opening 40 so that water let off from the bowl through the cleaning opening will take the waste material along with it, clearing it from the drinking bowl.

Preferably, one of the water outlet openings 44 is directed as a jet towards the cleaning opening 40 for brushing off any waste material which has turned into hard coating at this point.

The stopper may furthermore be run through the tailpipe so that a piece of it will be within the drinking bowl 10 when the cleaning opening 40 is shut and stoppered, this being to make certain that there is no slow building up of hard masses of waste at the cleaning opening 40.

The system of FIG. 3 makes certain of simple and readily undertaken trouble-free cleaning of the drinking bowl 10, the automatic cleaning effect being greatly helped along by placing the water inlet opening in the middle of the bowl.

The form of the invention of FIG. 4 is different to that to be seen in FIG. 3 more importantly in that that cleaning opening 40 is placed in the middle and at the lowest point in the drinking bowl, while the water inlet opening 15 is placed very near to it.

As part of a preferred further development of the invention, the design may be such that the cleaning opening 40 and the water inlet opening 15 may be changed over in function so that, dependent on experience got with using the bowl a change-over in the two functions may readily be undertaken by the farmer by joining up the hose with the other of the two openings in the bowl.

I claim:

1. An automatic drinking bowl system for animals, the system being designed to be attached to a fixed stanchion, the system comprising: a drinking bowl designed to be moved against an upwardly directed restoring force including an adjustable spring, a housing surrounding said bowl, and being attached on one side to said stanchion, a turnpin assembly attached to said housing on a side of the housing adjacent to said stanchion, said turnpin assembly providing a horizontal axis, said drinking bowl being attached to said housing by said turnpin assembly so that the bowl can rotate around said horizontal axis of said turnpin assembly in such a manner that an edge of the bowl opposite said turnpin assembly moves in an arc, spring adjustment means, said bowl moving through a desired distance to a lower position under the weight of water let into the bowl by way of a continuously adjustable water inlet valve, said valve having an external control means for controlling the operation of said valve, and, on water being taken therefrom, said bowl is moved upwards by said restoring force into an upper position at which said valve is opened, the valve being shut in said lower bowl position, a flexible hose joining said valve with a water inlet opening of said bowl, said opening being in a part of said bowl which is lower down than the rest of the bowl, a valve activating means comprising a driving part connected on the exterior of said water inlet valve, said driving part acting to increase said inlet valve water flow when moved in one direction and to decrease the flow when moved in the opposite direction, a bowl ear attached to said bowl on the side of the bowl opposite the water inlet valve, a firstclass lever rotatable relative to said housing and located outside said flexible hose and outside said water inlet valve, a first end of said lever being connected to said bowl ear, and the second end of said lever being joined with said driving part.

2. The invention as claimed in claim 1, designed for watering one animal at the time, said valve being designed for adjustment to the normal water drinking up-take rate of said animal.

3. The invention as claimed in claim 2, designed for cattle, the water inlet rate being of the order of 25 liters each minute.

4. The invention as claimed in any one of claims 1 to 3 having a lever joining said bowl with said valve for operation for the same.

5. The animal watering system of claim 1 further comprising:

a water direction-changing guide system at said inlet for cutting down reaction forces produced by said inlet and which would otherwise have the effect of moving such bowl in a downward direction and of stopping automatic control of water inlet.

6. An automatic drinking bowl system for animals, the system being mountable on a fixed stanchion, comprising:
   a drinking bowl,
   a housing surrounding said bowl, and being attached on one side to said stanchion,
   a turnpin assembly including a turnpin, said assembly, attached to said housing on the housing side opposite the side adjacent to the stanchion, and providing a horizontal axis,
   said drinking bowl being attached to said housing by said turnpin so that the bowl can rotate around said horizontal axis of said turnpin in such a manner that an edge of said bowl opposite said turnpin moves in an arc,
   an upwardly directed adjustable restoring force, acting to rotate said bowl upward around said turnpin,
   a continuously adjustable water inlet valve mounted on said housing opposite said turnpin, said bowl moving downward through a desired distance to a lower position under the weight of water let into the bowl by said water inlet valve,
   and, on water being taken therefrom, said bowl moving upward by said restoring force into an upward position, causing said valve to open so as to admit water, said valve being closed when bowl is in said lower position,
   a water inlet opening being in a lower part of said bowl,
   a flexible hose joining said water inlet valve and said water inlet opening,
   a driving part connected to said water inlet valve, said driving part having a driving ear receiving slot, said driving part rotating about a horizontal axis through said valve and acting to increase the water flow when rotated in one direction and to decrease the flow when rotated in the other,
   a driving ear fixed to said bowl on the side of the bowl opposite the turnpin, said ear being in sliding contact with said receiving slot of said driving part,
   said driving ear causing said driving part to rotate so as to increase or decrease the flow of water as the bowl rotates upwardly or downwardly, respectively, about the turnpin.

7. The invention as claimed in claim 1 or claim 6 further comprising a cleaning opening in the lowest inner part of said bowl, said water inlet opening formed with a plurality of water outlet openings, at least one of said water outlet openings being oriented near to and facing said cleaning opening so that water flowing from said at least one of said water outlet openings flushes debris from said cleaning opening, and a stopper for closing said cleaning opening 8. The invention as claimed in claim 7 having a downwardly running tailpipe stretching down from and joined with said cleaning opening.

9. The invention as claimed in claim 1 or claim 6, wherein the water inlet opening is placed at a lowest point within said bowl, an inner wall face of said bowl adjacent to said water inlet opening running steeply upwards from said water inlet opening, and further comprising a cleaning opening placed next to said water inlet opening, said water inlet opening formed with a plurality of water outlet openings, at least one of said water outlet openings being oriented near to and facing said cleaning opening so that water flowing from said at least one of said water outlet openings flushes debris from said cleaning opening.

10. The invention as claimed in claim 1 or claim 6, further comprising a cleaning opening placed at a lowest point within said bowl, an inner wall face of said bowl adjacent to said cleaning opening running steeply upwards from said cleaning opening, the water inlet opening being placed next to said cleaning opening, said water inlet opening formed with a plurality of water outlet openings, at least one of said water outlet openings being oriented near to and facing said cleaning opening so that water flowing from at least one of said water outlet opening flushes debris from said cleaning opening.

* * * * *